United States Patent
Hiji et al.

(10) Patent No.: US 8,070,982 B2
(45) Date of Patent: Dec. 6, 2011

(54) LIQUID CRYSTAL-CONTAINING COMPOSITION AND LIQUID CRYSTAL DISPLAY DEVICE THEREWITH

(75) Inventors: Naoki Hiji, Kanagawa (JP); Takeo Kakinuma, Kanagawa (JP); Chikara Manabe, Kanagawa (JP); Tadayoshi Ozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 175 days.

(21) Appl. No.: 12/247,790

(22) Filed: Oct. 8, 2008

(65) Prior Publication Data

US 2009/0191361 A1    Jul. 30, 2009

(30) Foreign Application Priority Data

Jan. 24, 2008  (JP) ................. 2008-013795

(51) Int. Cl.
  *C09K 19/00*  (2006.01)
  *C09K 19/06*  (2006.01)
  *C09K 19/32*  (2006.01)
  *C09K 19/52*  (2006.01)

(52) U.S. Cl. ................. 252/299.01; 252/299.6; 428/1.1; 428/1.2; 428/1.3; 430/20; 349/189

(58) Field of Classification Search ............ 428/1.1–1.3; 430/20; 252/299.01, 299.6; 349/189
See application file for complete search history.

(56) References Cited

U.S. PATENT DOCUMENTS

| 5,401,443 | A | 3/1995 | Nagano et al. | |
| 7,662,444 | B2 * | 2/2010 | Hiji et al. | 428/1.3 |
| 2005/0244590 | A1 | 11/2005 | Hiji et al. | |
| 2006/0115604 | A1 | 6/2006 | Hiji et al. | |
| 2008/0117380 | A1 * | 5/2008 | Harada et al. | 349/189 |

FOREIGN PATENT DOCUMENTS

| JP | A-05-057178 | 3/1993 |
| JP | A-2005-316243 | 11/2005 |
| JP | A-2006-183046 | 7/2006 |

* cited by examiner

*Primary Examiner* — Geraldina Visconti
(74) *Attorney, Agent, or Firm* — Oliff & Berridge, PLC (57) ABSTRACT

A liquid crystal-containing composition includes a microcapsule. In the microcapsule, a liquid crystal is encapsulated by a shell material component containing polyurea. Monomer components included in the polyurea include a polyisocyanate component, a high molecular weight polyamine component and a low molecular weight polyamine component.

18 Claims, 3 Drawing Sheets

FIG. 1

FIG. 3

LIQUID CRYSTAL-CONTAINING COMPOSITION AND LIQUID CRYSTAL DISPLAY DEVICE THEREWITH

CROSS-REFERENCE TO RELATED APPLICATION

This application is based on and claims priority under 35 USC 119 from Japanese patent Application No. 2008-013795 filed on Jan. 24, 2008.

BACKGROUND

1. Technical Field

The present invention relates to a liquid crystal-containing composition and a liquid crystal display device therewith.

2. Related Art

Liquid crystals are widely used as a display material. However, when a liquid crystal, which is fluid, is used as is, use thereof requires preparing a cell made of two substrates that are separated by a fixed distance and injecting a liquid crystal therebetween.

On the other hand, when a liquid crystal microcapsule obtained by covering a liquid crystal with a microcapsule shell is used, since the liquid crystal is covered by the microcapsule shell, the liquid crystal is strong against pressing force and bending. Further, because a cell can be formed by coating the microcapsule onto a substrate, there is an advantage in that injection of a liquid crystal, which is time consuming, is made unnecessary.

In general, when a liquid crystal is utilized as a display device, alignment control of the liquid crystal is important in order to sufficiently extract performance thereof.

SUMMARY

According to an aspect of the invention, there is provided a liquid crystal-containing composition containing a microcapsule in which a liquid crystal is encapsulated by a shell material component containing polyurea, the polyurea including monomer components including a polyisocyanate component, a high molecular weight polyamine component and a low molecular weight polyamine component.

BRIEF DESCRIPTION OF THE DRAWINGS

Exemplary embodiments of the present invention will be described in detail based on the following figures, wherein.

DETAILED DESCRIPTION

An exemplary embodiment of the present invention is explained in detail below.
<Liquid Crystal-Containing Composition>
A liquid crystal-containing composition of the present exemplary embodiment has a configuration containing a microcapsule in which a liquid crystal is encapsulated by a shell material component including polyurea.

Furthermore, in the liquid crystal-containing composition of the present exemplary embodiment, the polyurea includes monomer components including at least a polyisocyanate component, a high molecular weight polyamine component and a low molecular weight polyamine component.

Figure 1:
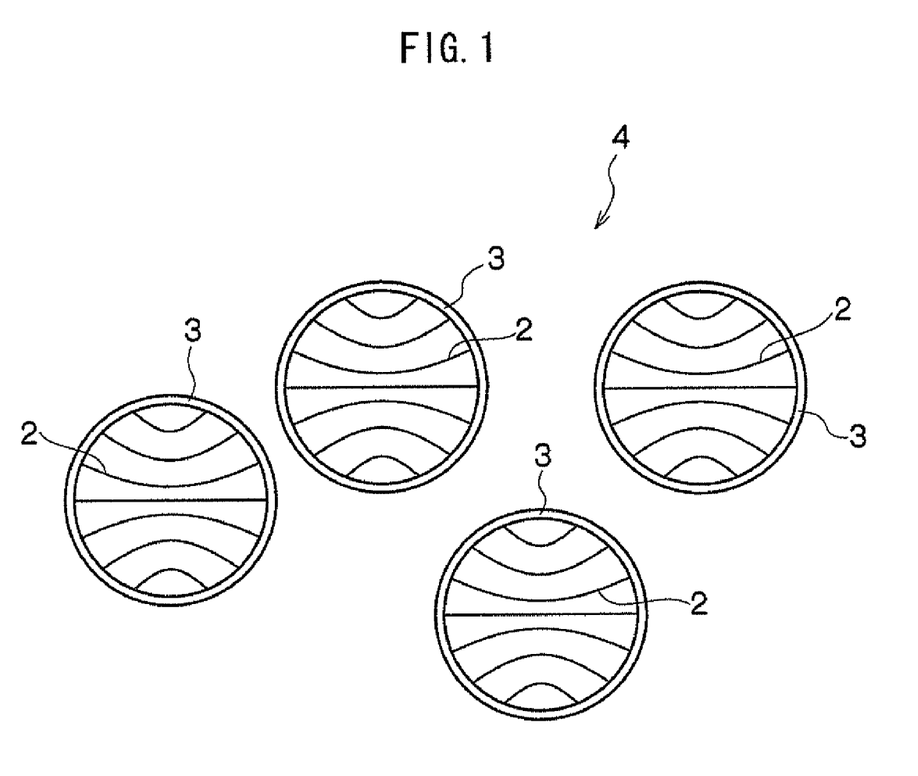
FIG. 1 is a schematic configurational diagram showing an example of a liquid crystal-containing composition according to an exemplary embodiment.

Specifically, for instance, a liquid crystal-containing composition 4, as shown in FIG. 1, includes a microcapsule in which a liquid crystal 2 is encapsulated by a microcapsule shell 3. The microcapsule shell 3 includes a shell material component containing polyurea.

Figure 2:
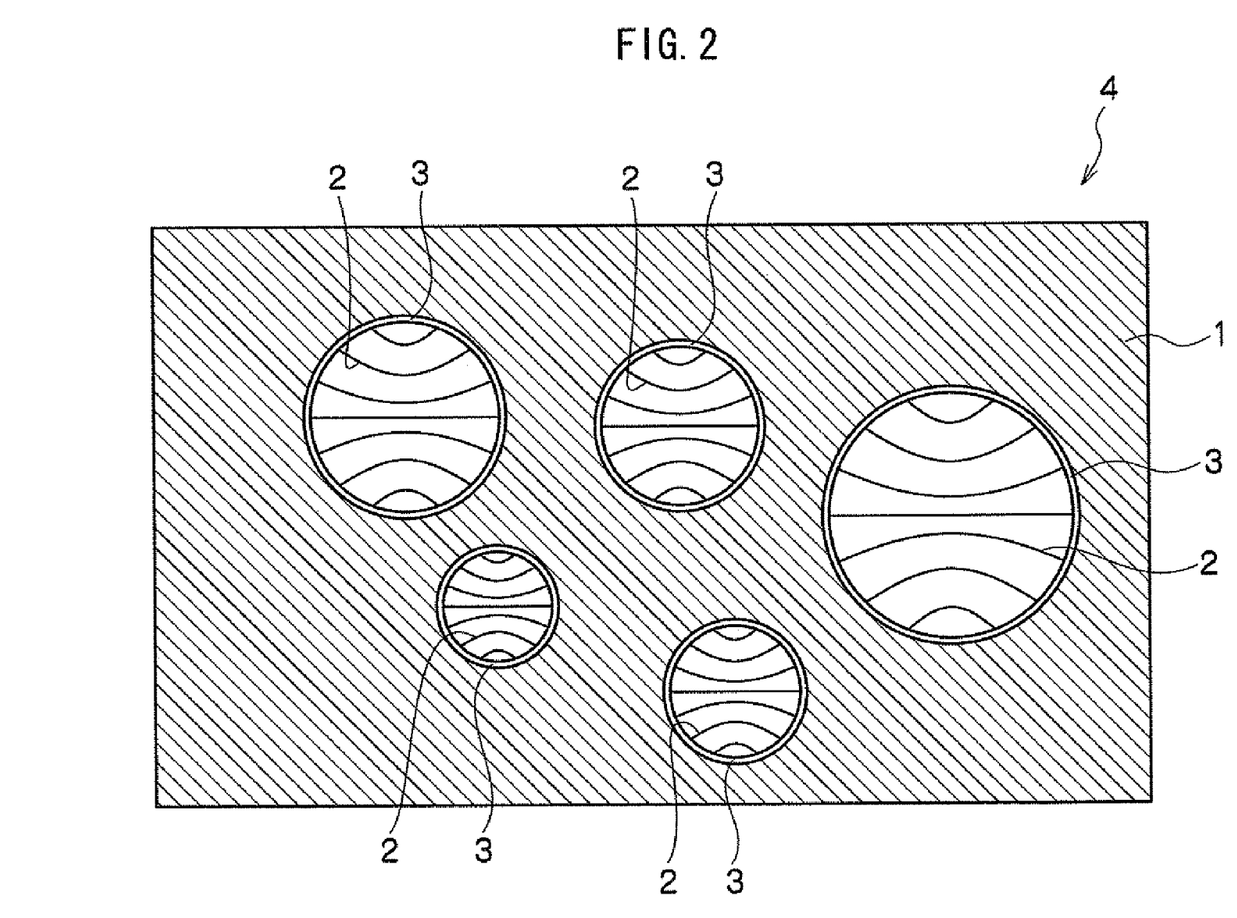
FIG. 2 is a schematic configurational diagram showing another example of a liquid crystal-containing composition according to an exemplary embodiment.

Furthermore, for instance, the liquid crystal-containing composition 4, as shown in FIG. 2, may have a form having a resin member 1 in which the microcapsules are dispersed and held, wherein, in the microcapsules, a microcapsule shell 3 encapsulates a liquid crystal 2.

It should be noted that the liquid crystal-containing composition 4 according to the exemplary embodiment may be in the form of, for example, a slurry composition made of a microcapsule in which a microcapsule shell 3 encapsulates a liquid crystal 2, or an ink composition obtained by mixing the slurry composition and a binder polymer.

In the course of generating polyurea in the presence of a polyisocyanate, a polyamine and water, reactions shown by formulae (1) and (2) below occur.

Formula (1):

Formula (2):

Herein, $R^1$ is the other moiety than one arbitrarily selected isocyanate group of a polyisocyanate (for instance, $R^1$ is $OCN-CH_2-C_6H_4-CH_2-$ when the polyisocyanate is xylene diisocyanate, $R^1$ is $OCN-(CH_2)_6-$ when the polyisocyanate is 1,6-hexane diisocyanate, and $R^1$ is $OCN-C_6H_4-CH_2-C_6H_4-$ when the polyisocyanate is 4,4'-diphenylmethane diisocyanate).

Furthermore, $R^2$ expresses the other moiety than one arbitrarily selected amino group of a polyamine (for instance, $R^2$ is $H_2N-CH_2CH_2-$ when the polyamine is ethylenediamine, and $R^2$ is $H_2N-CH_2CH_2-NH-CH_2CH_2-$ when the polyamine is ethylenetriamine).

In a process of preparing a liquid crystal-containing composition through an interfacial polymerization method described below, water molecules penetrate from an aqueous phase to inside a liquid droplet (oil phase) in a dispersion liquid and a reaction shown by the formula (1) occurs inside of the liquid droplet.

A liquid crystal-containing composition according to the present exemplary embodiment is explained in detail below. Please note that reference numerals are omitted in the following descriptions.
—Liquid Crystal—
A rod-shaped liquid crystal can be used as the liquid crystal. For instance, a nematic liquid crystal, a cholesteric liquid crystal and a smectic liquid crystal can all be used. These commonly known liquid crystals may be used.

Among the above liquid crystals, a cholesteric liquid crystal is preferable. The cholesteric liquid crystal is a liquid crystal material containing an optically active compound and is obtained as a result of such methods as: 1) a method where an optically active compound called a chiral agent or the like is added to a nematic liquid crystal; or 2) a method where a liquid crystal material that is optically active itself such as a cholesterol derivative is used. In the case of the former, as a nematic liquid crystal material, a composition containing a commonly known nematic liquid crystal such as a cyanobiphenyl-based liquid crystal, a phenylcyclohexane-based liquid crystal, a phenyl benzoate-based liquid crystal, a cyclohexyl benzoate liquid crystal, an azomethine-based liquid crystal, an azobenzene-based liquid crystal, a pyrimidine-based liquid crystal, a dioxane-based liquid crystal, a cyclohexyl cyclohexane-based liquid crystal, a stilbene-based liquid crystal or a tolan-based liquid crystal is used. Examples of the chiral agents include cholesterol derivatives and compounds having an optically active group such as a 2-methylbutyl group.

Additives such as a dye or particles may be added to the cholesteric liquid crystal. Furthermore, the cholesteric liquid crystal may be gelated by use of a crosslinkable polymer or a hydrogen-bonding gelling agent. Still furthermore, any one of a high molecular weight liquid crystal, a medium molecular weight liquid crystal and a low molecular weight liquid crystal, or a mixture thereof, may be used as the cholesteric liquid crystal. The spiral pitch of the cholesteric liquid crystal may be varied according to the kind and amount of the chiral agent and the material of the liquid crystal. The wavelength of selected reflection may be within any of a visible-light wavelength region, an UV wavelength region or an infrared wavelength region. Please note that the volume average particle diameter of cholesteric liquid crystal droplets (including microcapsules) dispersed in a polymer described below is, in order to develop a memory property, desirably at least 3 times the spiral pitch of the cholesteric liquid crystal.

—Microcapsule—

The microcapsule has a shell containing a shell material component including polyurea. The polyurea includes monomer components including a polyisocyanate component, a high molecular weight polyamine component and a low molecular weight polyamine component, and, as necessary, may include one or more other optional components. More specifically, the polyurea may be generated by reacting a polyisocyanate, a high molecular weight polyamine and a low molecular weight polyamine and, as necessary, other optional compounds to polymerize.

(Polyisocyanate)

Specific examples of polyisocyanates include: aliphatic polyisocyanates such as ethylene diisocyanate, tetramethylene diisocyanate, hexamethylene diisocyanate, dodecamethylene diisocyanate, 2,2,4-trimethylhexane diisocyanate, lysine diisocyanate, 2,6-diisocyanate methyl caproate, bis(2-isocyanateethyl)fumarate, bis(2-isocyanateethyl)carbonate or 2-isocyanateethyl-2,6-diisocyanatehexanoate; alicyclic polyisocyanates such as isophorone diisocyanate, dicyclohexylmethane diisocyanate, cyclohexylene diisocyanate, methylcyclohexylene diisocyanate and bis(2-isocyanateethyl)-4-cyclohexene-1,2-dicarboxylate; aromatic aliphatic polyisocyanates such as xylylene diisocyanate and diethylbenzene diisocyanate; and aromatic polyisocyanates such as trilene diisocyanate, diphenylmethane diisocyanate and naphthylene diisocyanate. Furthermore, multimeric complexes such as adduct compounds of the above diisocyanates, isocyanulate compounds of the diisocyanates, biuret compounds of the diisocyanates and allophanate compounds of the diisocyanates are also within the scope of the polyisocyanates.

(High Molecular Weight Polyamine)

Specific examples of high molecular weight polyamines include polylysine, Hoffmann-modified polyacrylamide, polyvinylamine, polyamidine and polyallylamine. Among these, polyallylamine is preferable. Furthermore, a high molecular weight polyamine desirably has a primary amino group.

The weight average molecular weight of a high molecular weight polyamine is desirably from 3,000 to 500,000 (or from about 3,000 to about 500,000) and more desirably from 10,000 to 100,000.

The weight average molecular weight of a high molecular weight polyamine is measured by gel permeation chromatography (GPC). As the GPC system, an 8020-SERIES (trade name, manufactured by Tosoh Corporation) is used. As columns, an aqueous gel-filtration GS-220HQ (trade name, manufactured by Asahi Pack K. K., exclusion limit molecular weight: 3000) and a GS-620HQ (trade name, manufactured by Asahi Pack K. K., exclusion limit molecular weight: 2,000,000) are connected in tandem to the GPC system. A 0.4 mole/L sodium chloride aqueous solution is used as an eluent. As experimental conditions, a sample concentration is set at 0.5 g/100 ml, a flow rate is set at 1 ml/min, a sample charge amount is set at 20 µl, a measurement temperature is set at 30° C., and a differential refractometer is used.

(Low Molecular Weight Polyamine)

Specific examples of low molecular weight polyamines include hydrazine, 1,2-ethylene diamine, 1,3-propane diamine, 1,4-butane diamine, 1,5-pentane diamine, 1,6-hexane diamine, diethylene triamine, triethylene tetramine, tetraethylene pentamine, urea, carbohydrazide and 1,3-diaminobenzene. Among these, ethylene diamine is desirable. Furthermore, low molecular weight polyamine may have a primary amino group.

The molecular weight of low molecular weight polyamine is desirably from 32 to 300 (or from about 32 to about 300) and more desirably from 50 to 200.

(Other Optional Component)

An example of the optional component is, specifically, an alignment component (vertical alignment component) made of a compound having a hydroxy group and at least one of an alkyl group or a fluoroalkyl group. For instance, when a cholesteric liquid crystal is used as a liquid crystal and a vertical alignment component is introduced in a microcapsule shell, the horizontal alignment property that the microcapsule intrinsically has is cancelled out by the vertical alignment property imparted by introduction of the vertical alignment component, and the alignment control force weakens. Thereby, the cholesteric liquid crystal layer may be oriented uniformly with no variation in orientation direction, resulting in an improvement in the display contrast. Furthermore, since the alignment control force is weakened, in whatever direction a liquid crystal molecule contacting with a microcapsule is aligned, energetic difference is small; accordingly, both P alignment and F alignment may be stable against the lapse of time. Specific details of the vertical alignment component are as described in JP-A No. 2005-316243, which is incorporated herein by reference.

Furthermore, a polyol component may be included as an optional component. The polyol reacts with a polyisocyanate according to the formula shown below to generate a polyurethane.

Formula: $R^1$—NCO+HO—$R^3$(polyol)→$R^1$—NH-COO—$R^3$(polyurethane)

Herein, $R^1$ is the same as mentioned above. Furthermore, $R^3$ expresses the other moiety than one arbitrarily selected hydroxy group of the polyol (for instance, when the polyol is 1,6-hexane diol, $R^3$ is HO(CH$_2$)$_6$—, and when the polyol is trimethylolpropane, $R^3$ is CH$_3$CH$_2$C(CH$_2$OH)$_2$—CH$_2$—).

Examples of polyol components include a polyester polyol component and a polyether polyol component. However, from the viewpoint of an improvement in the CR (contrast) and suppression of an afterimage phenomenon in particular, a polyester polyol component is preferable. The polyol component may be incorporated into the microcapsule shell by adding a polyol (for example, a polyester polyol or a polyether polyol) together with the above-mentioned raw materials of the microcapsule.

The polyester polyol may be, for example, a polyester polyols obtained by reacting (i) a dibasic acid (such as terephthalic acid, isophthalic acid, adipic acid, azelaic acid or sebacic acid) or a dialkyl ester or mixture thereof, and (ii) a glycol (such as ethylene glycol, propylene glycol, diethylene glycol, butylene glycol, neopentyl glycol, 1,6-hexane glycol, 3-methyl-1,5-pentanediol, 3,3'-dimethylolheptane, polyoxyethylene glycol, polyoxypropylene glycol or polytetramethylene ether glycol) or a mixture thereof. Further examples of the polyester polyols include polyester polyols obtained by ring-opening polymerization of lactones (such as polycaprolactone, polyvalerolactone or poly(β-methyl-γ-valerolactone)).

On the other hand, examples of polyether polyols include polyethylene glycol, polyoxyethylene glycol, polyoxypropylene glycol, polytetramethylene glycol and copolymers thereof.

The weight average molecular weight of polyol is desirably from 20,000 to 1,000,000, more desirably from 20,000 to 500,000, and still more desirably from 20,000 to 50,000. When the weight average molecular weight is not less than the above-described lower limit, in particular, an afterimage phenomenon may be effectively diminished. However, when the weight average molecular weight is more than the above-described upper limit, solubility may be reduced along with the compatibility with a solvent deteriorating, which may result in the microcapsules being unable to be uniformly prepared.

Herein, the weight average molecular weight of polyol is measured by gel permeation chromatography (GPC). As the GPC system, an 8020-SERIES (trade name, manufactured by Tosoh Corporation) is used. As columns, TSKgel G4000HXL, TSKgel G2500HX1 and TSKgel G1000HXL (trade name, manufactured by Tosoh Corporation, 7.8 mm ID×30 cm) are used. THF (tetrahydrofuran) is used as an eluent. As experimental conditions, a sample concentration is set at 0.2% by weight, a flow rate is set at 1 ml/min, a sample injection amount is set at 50 μl, a measurement temperature is set at 40° C. and a differential refractometer is used.

The content of the polyester polyol component is, with respect to the total weight of the capsule shell components, desirably from 1% to 50% by weight, more desirably from 5% to 25% by weight and still more desirably from 10% to 15% by weight. When the content is within the above-described range, CR (contrast) may be effectively improved and the afterimage phenomenon may be suppressed.

—Method of Preparation of Liquid Crystal-containing Composition—

A method of preparing of a liquid crystal-containing composition of the present exemplary embodiment is described below.

According to a method of preparing a liquid crystal-containing composition of the present exemplary embodiment, a polyisocyanate, a high molecular weight polyamine and a low molecular weight polyamine are reacted to generate polyurea to form a microcapsule shell that encapsulates a liquid crystal.

Examples of general methods of preparing a liquid crystal-containing composition include: 1) a phase separation method where a liquid crystal-dispersed aqueous polymer solution is phase-separated to form a microcapsule shell on a surface of a liquid crystal droplet; 2) a drying method in liquid, where a polymer and a liquid crystal are dissolved in a common solvent, followed by dispersing this in an aqueous phase, further followed by evaporating the solvent; 3) an interfacial polymerization method where a mixed solution (oil phase liquid) of a liquid crystal and an oil-soluble monomer A is dispersed in an aqueous phase, followed by adding a water-soluble monomer B thereto to react the monomer A and monomer B by interfacial polymerization to form a microcapsule shell; and 4) an in situ polymerization method where a monomer is dissolved in a liquid crystal or an aqueous phase and polymerized by heating or the like to form a microcapsule shell by a precipitated polymer.

As a method of preparing a liquid crystal-containing composition of the present exemplary embodiment, among the above preparation methods, an interfacial polymerization method is desirable. Specifically, in the interfacial polymerization method, polyisocyanate is used as an oil-soluble monomer A and both high molecular weight polyamine and low molecular weight polyamine are used as water-soluble monomers B.

That is, a method of preparing a liquid crystal-containing composition of the present exemplary embodiment may include: preparing an oil phase by mixing a liquid crystal and polyisocyanate; preparing a dispersion liquid by dispersing the oil phase in an aqueous phase; adding both high molecular weight polyamine and low molecular weight polyamine to the dispersion liquid; and forming a microcapsule shell by generating polyurea as a result of heating the dispersion liquid to react the polyisocyanate, the high molecular weight polyamine and the low molecular weight polyamine, the liquid crystal being encapsulated by the microcapsule shell.

More specifically, for instance, first, a liquid crystal and polyisocyanate are mixed to prepare an oil phase. Then, the oil phase is dispersed in an aqueous phase to prepare a dispersion liquid. Next, high molecular weight polyamine and low molecular weight polyamine are added to the dispersion liquid, followed by heating the dispersion liquid. By completing these steps, polyisocyanate, high molecular weight polyamine and low molecular weight polyamine react to generate polyurea with which a microcapsule shell is formed and, at the same time, the liquid crystal is encapsulated by the microcapsule shell.

—Amount—

A liquid crystal-containing composition of the present exemplary embodiment may be prepared, with respect to 100 parts by weight of a liquid crystal, from 1 to 20 parts by weight (or from about 1 to about 20 parts by weight) of polyisocyanate, from 1 to 10 parts by weight (or from about 1 to about 10 parts by weight) of high molecular weight polyamine and from 0.1 to 1 parts by weight (or from about 0.1 to about 1 part by weight) of low molecular weight polyamine.

When the amounts of the polyisocyanate, high molecular weight polyamine and low molecular weight polyamine are within the above range, failure in driving caused by decrease in strength of the electric field applied to the liquid crystal may be suppressed, and the display contrast may be improved at the same time.

The amount of polyisocyanate added in the preparation of a liquid crystal-containing composition is, with respect to 100 parts by weight of the liquid crystal, desirably from 1 to 20 parts by weight and more desirably from 5 to 15 parts by weight.

An amount of high molecular weight polyamine added in the preparation of a liquid crystal-containing composition is, with respect to 100 parts by weight of the liquid crystal, desirably from 1 to 10 parts by weight and more desirably from 2 to 5 parts by weight.

Furthermore, the amount of high molecular weight polyamine may be from 0.1 to 1 times (or from about 0.1 to about 1 times) the amount of polyisocyanate.

The amount of low molecular weight polyamine added in the preparation of a liquid crystal-containing composition is, with respect to 100 parts by weight of the liquid crystal, desirably from 0.1 to 1 part by weight and more desirably from 0.2 to 0.6 parts by weight.

Furthermore, the amount of low molecular weight polyamine may be from 0.01 to 1 times (or from about 0.01 to about 1 times) the amount of polyisocyanate.

Still furthermore, the amount of low molecular weight polyamine may be from 0.01 to 1 times (or from about 0.01 to about 1 times) the amount of high molecular weight polyamine.

In the liquid crystal-containing composition, the polyisocyanate component amount may be about 1 to about 20 parts by weight (or 1 to 20 parts by weight) with respect to 100 parts by weight of the liquid crystal, the high molecular weight polyamine component amount may be about 1 to about 10 parts by weight (or 1 to 10 parts by weight) with respect to 100 parts by weight of the liquid crystal, and the low molecular weight polyamine component amount may be about 0.1 to about 1 parts by weight (or 0.1 to 1 parts by weight) with respect to 100 parts by weight of the liquid crystal. The weight average molecular weight of a high molecular weight polyamine of the high molecular weight polyamine component may be from about 3,000 to about 500,000 (or 3,000 to 500,000). The molecular weight of a low molecular weight polyamine of the low molecular weight polyamine component may be from about 32 to about 300 (or 32 to 300).

Regarding the use of the liquid crystal-containing composition according to the present exemplary embodiment, for instance, the microcapsules containing the liquid crystal may be dispersed in a binder material and the obtained dispersion may be used to coat various surfaces. As a result, since the liquid crystal is protected in the microcapsule, another functional layer may be formed thereon and the mechanical strength against pressure and bending may be excellent; accordingly, there are a wide range of uses of the liquid crystal-containing composition. Furthermore, by using a curable binder material, after the binder material in which the microcapsules are dispersed is formed into a layer and cured, a resin member in which the microcapsules containing the liquid crystal are dispersed and held is formed.

The liquid crystal-containing composition according to the present exemplary embodiment may be coated on a substrate by means of a printing method such as a screen printing method, a relief printing method, a gravure printing method, a planographic printing method or a flexo printing method; or by means of a coating method such as a spin coating method, a bar coating method, a dip coating method, a roll coating method, a knife coating method or a die coating method.

Furthermore, the liquid crystal-containing composition according to the present exemplary embodiment may be utilized, for example, in a display device, an image/information recording device and a space light modulator. In particular, the liquid crystal-containing composition may preferably be utilized in display devices, such as liquid crystal display devices. A liquid crystal display device according to the present exemplary embodiment will be described below.

<Liquid Crystal Display Device>

Figure 3:
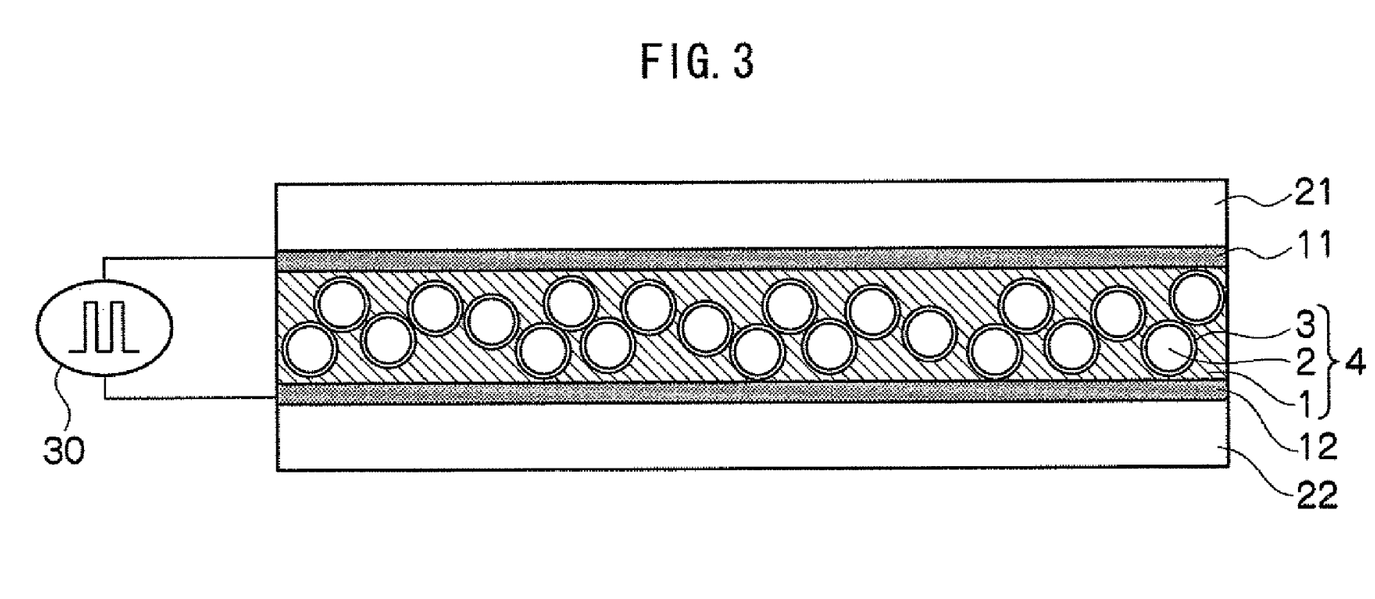
FIG. 3 is a schematic configurational diagram showing an example of a liquid crystal display device according to an exemplary embodiment.

A liquid crystal display device according to the present exemplary embodiment is configured by sandwiching a liquid crystal-containing composition according to the present exemplary embodiment between a pair of electrodes. Specifically, as shown in FIG. 3, an example of the liquid crystal display device has a configuration in which a liquid crystal-containing composition 4 is sandwiched between substrates 21 and 22 that are respectively provided with electrodes 11 and 12, and a voltage pulse is applied by a driver circuit 30 to display. As a display background, a light absorbing member may be disposed between the liquid crystal-containing composition 4 and an electrode 12, or on a back surface of the substrate 22. The substrates 21 and 22 each may include glass or a resin (a transparent dielectric material such as polyethylene terephthalate, polyether sulfone, polycarbonate or polyolefin), for instance. The electrodes 11 and 12 each may be, for example, a transparent conductive film such as a film of indium tin oxide alloy or zinc oxide.

Herein, the liquid crystal display device shown in FIG. 3 has a configuration in which the liquid crystal-containing composition 4 includes a resin member 1 in which microcapsules are dispersed and held, and a liquid crystal 2 is encapsulated by a microcapsule shell 3 in the microcapsules.

When, a cholesteric liquid crystal, for instance, is used as a liquid crystal 2 in the liquid crystal display device according to the present exemplary embodiment, the liquid crystal-containing composition according to the present exemplary embodiment emphasizes optical difference between the P alignment and F alignment in a memory state of the cholesteric liquid crystal; accordingly, as a display mode, the following modes may be used besides a selected reflection mode that has been described hitherto: a scattering-transmission mode that utilizes the difference in intensities of light scattering between the P alignment and the F alignment, an optical rotation mode that utilizes the difference in degrees of optical rotation, a birefringence mode that utilizes the difference in birefringence, and the like. In this case, at least one of a polarization plate or a retardation plate may be used additionally as an auxiliary member. Furthermore, a guest-host mode may be used for display by adding a dichroic dye to a liquid crystal.

Examples of driving methods of a liquid crystal display device according to the present exemplary embodiment include commonly known driving methods such as: 1) a segment driving method in which a liquid crystal-containing composition is sandwiched between electrodes patterned in a display shape to drive; 2) a simple matrix driving method in which a liquid crystal-containing composition is sandwiched between a pair of intersecting (for example orthogonal) striped electrode substrates and an image is written-in by line-sequential scanning; 3) an active-matrix driving method in which an active device such as a thin film transistor, a thin film diode or a MIM (metal-insulator-metal) device is provided to each pixel, to drive via the active device; 4) an optical driving method in which a liquid crystal-containing composition is attached to a photoconductor, sandwiched between a pair of electrodes, and a voltage is applied thereto while projecting a light image to write-in an image; 5) a thermal driving method in which a liquid crystal-containing composition sandwiched between a pair of electrodes is transited to the P alignment by applying a voltage, and heated to a phase transition temperature or more by use of laser or a thermal head to write-in an image, or 6) an electrostatic driving method in which a liquid crystal-containing composition is coated on an electrode substrate, and an image is written-in by use of a stylus head or an ion head.

EXAMPLES

The present invention will be specifically described with reference to examples below. However, the examples do not restrict the invention. Unless stated clearly, "parts" means "parts by weight".

Example A

Example A-1

First, 86.25 parts of nematic liquid crystal E7 (trade name, manufactured by Merck Ltd.), 11.0 parts of a chiral agent R811 (trade name, manufactured by Merck Ltd.) and 2.75 parts of a chiral agent R1011 (trade name, manufactured by Merck Ltd.) are mixed and thereby 100 parts of a cholesteric liquid crystal that selectively reflects light having a wavelength of 650 nm is obtained.

Next, 100 parts of the cholesteric liquid crystal, 13.3 parts (that is, 10 parts solid content) of Takenate D-110N (trade name, manufactured by Mitsui Chemicals Polyurethanes, Inc., solid content: 75%) as a polyisocyanate and 3 parts of pentadecanol (manufactured by Aldrich Co., Ltd.) as a precursor of a vertical alignment component are dissolved in 100 parts of ethyl acetate to prepare an oil phase composition. This is added in 800 parts of a 1% polyvinyl alcohol aqueous solution, followed by agitating and dispersing by use of a mixer, and thereby an o/w emulsion having a volume average particle diameter of 7 μm is prepared.

Thereto, as a high molecular weight polyamine, 40 parts (that is, an amount of high molecular weight polyamine is 4 parts) of a 10% aqueous solution of polyallylamine (trade name: PAA-10C, molecular weight: 15,000, manufactured by Nitto Boseki Co., Ltd.) and, as a low molecular weight polyamine, 2.5 parts (that is, the amount of ethylenediamine is 0.25 parts) of a 10% aqueous solution of ethylenediamine (trade name: EDA, molecular weight: 60, manufactured by Aldrich Co., Ltd.) are added, followed by heating at 70° C. for 2 hours to form microcapsules having polyurea as a shell material. After the microcapsules are recovered by centrifugal operation, an aqueous solution of polyvinyl alcohol is added to form a microcapsule liquid crystal coating composition.

Next, the microcapsule liquid crystal coating composition is coated on a commercially available ITO-deposited PET resin film, using an applicator to ensure the dried film thickness to be 30 μm. Thereon, a polyvinyl alcohol aqueous solution in which carbon black is dispersed is coated, so as to have a dried film thickness of 3 μm, to form a light-absorbing layer. On the other hand, another ITO-deposited PET resin film is prepared, a two-component urethane adhesive is coated thereon so as to have a dried film thickness of 3 μm, and this is adhered to a substrate on which the microcapsule liquid crystal coating composition has been coated, and thereby, a liquid crystal display device (device A-1) is formed.

Example A-2 through Example A-3

Liquid crystal display devices (device A-2 through device A-3) are formed in the same manner as in Example A-1, except that the amounts of polyisocyanate, high molecular weight polyamine and low molecular weight polyamine are set respectively to the values shown in Table 1.

Comparative Example A-1

A liquid crystal display device (Device a) is formed in the same manner as in Example A-1, except that the low molecular weight polyamine is not used and the amounts of the polyisocyanate and the high molecular weight polyamine are set respectively to the values shown in Table 1.

Comparative Example A-2

A liquid crystal display device (Device b) is formed in the same manner as in Example A-1, except that the high molecular weight polyamine is not used and the amounts of the polyisocyanate and the low molecular weight polyamine are set respectively to the values shown in Table 1.
<Evaluation>
—Evaluation of Capacitance Characteristics—
The capacitance characteristics (frequency characteristics) of each resulting liquid crystal display device are evaluated.

Specifically, capacitance of each liquid crystal display device (between electrodes thereof) at an applied voltage frequency of 1 Hz and capacitance of each liquid crystal display device (between electrodes thereof) at an applied voltage frequency of 1 kHz are measured by use of an impedance analyzer (trade name: SI-1260, manufactured by Solatron, Ltd.), and a ratio of measurements (capacitance at 1 Hz of applied voltage frequency/capacitance at 1 kHz of applied voltage frequency) is obtained as a capacitance characteristic value ($\epsilon 1/1K$). An effective value of an applied voltage is 140 V. A value of capacitance characteristics is preferred to be smaller because this means the content of ionic impurities is less.

Evaluation results are shown in Table 1.
—Evaluation of CR (Contrast)—
CR (contrast) evaluation is carried out for each of the resulting liquid crystal display devices.

The voltage (V)-reflectance (Y) characteristics of each of the liquid crystal display device samples is measured, and CR (contrast) is defined as a ratio of the maximum reflectance to the minimum reflectance.

Specifically, between upper and lower electrodes of a liquid crystal display device sample, a symmetrical rectangular wave puse (reset voltage) having a size of 600 V, a frequency of 1 kHz and a duration of 1 sec is applied to make a liquid crystal display sample display uniformly bright (white) (white display reset), followed by applying a write voltage V (symmetrical rectangular pulse having a frequency of 1 kHz and a duration of 200 msec) and measuring the luminous reflectance 3 sec after the completion of the application. The measurement is repeated by varying the size of the write voltage stepwise and thereby the voltage (V)-reflectance (Y) characteristics are obtained. The reflectance is measured by use of a spectral brightness meter CM-2022 (trade name, manufactured by Minolta Co., Ltd.) and, as the reflectance, the luminous reflectance is used.

Evaluation results are shown in Table 1.

TABLE 1

| | | Amount (parts by weight) | | | Evaluation | |
|---|---|---|---|---|---|---|
| | | | High Molecular Weight | Low Molecular Weight | | |
| Example | Device | Polyisocyanate | Polyamine | Polyamine | $\epsilon 1/1K$ | CR |
| Example A-1 | Device A-1 | 10 | 4 | 0.25 | 1.51 | 11.7 |
| Example A-2 | Device A-2 | 10 | 4 | 0.5 | 1.54 | 9.7 |
| Example A-3 | Device A-3 | 10 | 4 | 1.0 | 1.66 | 7.7 |
| Comparative Example A-1 | Device a | 10 | 4 | 0 | 2.03 | 14.5 |
| Comparative Example A-2 | Device b | 10 | 0 | 0.25 | 1.60 | 5.0 |

Example B

Example B-1 through Example B-2

Liquid crystal display devices (device B-1 and Device B-2) are formed in the same manner as in Example A-1, except that the kinds and amounts of the polyisocyanate, the high molecular weight polyamine and the low molecular weight polyamine are set respectively as shown in Table 2.

TABLE 2

| | Polyisocyanate | | High Molecular Weight Polyamine | | | Low Molecular Weight Polyamine | | |
|---|---|---|---|---|---|---|---|---|
| Device | Kind | Amount (parts by weight) | Kind | Molecular Weight | Amount (parts by Weight) | Kind | Molecular Weight | Amount (parts by weight) |
| Device B-1 | Takenate D110N (trade name, manufactured by Mitsui Chemical Polyurethanes, Inc. | 10 | Polyallyamine (manufactured by Nitto Boseki Co., Ltd.) | 15,000 | 4 | 1,6-hexamethylene diamine (manufactured by Aldrich Co., Ltd.) | 112 | 0.25 |
| Device B-2 | Takenate D110N (trade name, manufactured by Mitsui Chemical Polyurethanes, Inc. | 10 | Polyallyamine (manufactured by Nitto Boseki Co., Ltd.) | 15,000 | 4 | Diethylene triamine (manufactured by Aldrich Co., Ltd.) | 103 | 0.25 |

The capacitance characteristics (frequency characteristics) and CR (contrast) of each resulting liquid crystal display device are evaluated. Results thereof are shown in Table 3.

TABLE 3

| | | Evaluation | |
|---|---|---|---|
| Example | Device | $\epsilon 1/1K$ | CR |
| Example B-1 | Device B-1 | 1.39 | 10.6 |
| Example B-2 | Device B-2 | 1.22 | 11.9 |

From the above-mentioned results it is found that, in comparison with comparative examples, the capacitance characteristics in examples are excellent, that is, drive failure due to a decrease in an electric field strength applied to a liquid crystal is suppressed. Furthermore, it is found that, in particular, in examples A-1, A-2 and A-3 and B-1 and B-2, both the capacitance characteristics and contrast are excellent, that is, suppression of the drive failure and an improvement in the display contrast are both realized.

What is claimed is:

1. A liquid crystal-containing composition, comprising:
a microcapsule in which a liquid crystal is encapsulated by a shell material component including polyurea, monomer components of the polyurea including a polyisocyanate component, a high molecular weight polyamine component and a low molecular weight polyamine component,
wherein the liquid crystal-containing composition is prepared with respect to 100 parts by weight of the liquid crystal, from about 1 to about 20 parts by weight of a polyisocyanate, from about 1 to about 10 parts by weight of a high molecular weight polyamine, and from about 0.1 to about 1 part by weight of a low molecular weight polyamine.

2. A liquid crystal-containing composition, comprising:
a microcapsule in which a liquid crystal is encapsulated by a shell material component including polyurea, monomer components of the polyurea including a polyisocyanate component, a high molecular weight polyamine component and a low molecular weight polyamine component,
wherein the polyisocyanate component amount is about 1 to about 20 parts by weight with respect to 100 parts by weight of the liquid crystal, the high molecular weight polyamine component amount is about 1 to about 10 parts by weight with respect to 100 parts by weight of the liquid crystal, and the low molecular weight polyamine component amount is about 0.1 to about 1 parts by weight with respect to 100 parts by weight of the liquid crystal.

3. The liquid crystal-containing composition of claim 2, wherein a weight average molecular weight of a high molecular weight polyamine of the high molecular weight polyamine component is from about 3,000 to about 500,000.

4. The liquid crystal-containing composition of claim 2, wherein a molecular weight of a low molecular weight polyamine of the low molecular weight polyamine component is from about 32 to about 300.

5. The liquid crystal-containing composition of claim 1, wherein the amount of the high molecular weight polyamine is from about 0.1 to about 1 times the amount of the polyisocyanate.

6. The liquid crystal-containing composition of claim 1, wherein the amount of the low molecular weight polyamine is from about 0.01 to about 1 times the amount of the polyisocyanate.

7. The liquid crystal-containing composition of claim 1, wherein the amount of the low molecular weight polyamine is from about 0.01 to about 1 times the amount of the high molecular weight polyamine.

8. The liquid crystal-containing composition of claim 1, wherein a weight average molecular weight of the high molecular weight polyamine is from about 3,000 to about 500,000.

9. The liquid crystal-containing composition of claim 1, wherein a molecular weight of the low molecular weight polyamine is from about 32 to about 300.

10. The liquid crystal-containing composition of claim 1, wherein the high molecular weight polyamine is polylysine, Hoffmann-modified polyacrylamide, polyvinylamine, polyamidine or polyallylamine.

11. The liquid crystal-containing composition of claim 1, wherein the low molecular weight polyamine is hydrazine, 1,2-ethylenediamine, 1,3-propanediamine, 1,4-butanediamine, 1,5-pentanediamine, 1,6-hexanediamine (hexamethylenediamine), diethylenetriamine, triethylenetetramine, tetraethylenepentamine, urea, carbohydrazine or 1,3-diaminobenzene.

12. The liquid crystal-containing composition of claim 1, wherein the liquid crystal is a cholesteric liquid crystal.

13. The liquid crystal-containing composition of claim 1, wherein the microcapsule is dispersed in a binder material.

14. A liquid crystal display device, comprising:
a pair of electrodes, and
the liquid crystal-containing composition of claim 1, which is sandwiched between the pair of electrodes.

15. The liquid crystal display device of claim 14, wherein the liquid crystal-containing composition is prepared by adding the high molecular weight polyamine at a ratio of from about 0.1 to about 1 times the amount of the polyisocyanate.

16. The liquid crystal display device of claim 14, wherein the liquid crystal-containing composition is prepared by adding the low molecular weight polyamine at a ratio of from about 0.01 to about 1 times the amount of the polyisocyanate.

17. The liquid crystal display device of claim 14, wherein the liquid crystal-containing composition is prepared by adding the low molecular weight polyamine at a ratio of from about 0.01 to about 1 times the amount of the high molecular weight polyamine.

18. A liquid crystal display device, comprising:
a pair of electrodes, and
a liquid crystal-containing composition, which is sandwiched between the pair of electrodes, the liquid crystal-containing composition comprising:
a microcapsule in which a liquid crystal is encapsulated by a shell material component including polyurea, monomer components of the polyurea including a polyisocyanate component, a high molecular weight polyamine component and a low molecular weight polyamine component,
wherein in the liquid crystal-containing composition, the polyisocyanate component amount is about 1 to about 20 parts by weight with respect to 100 parts by weight of the liquid crystal, the high molecular weight polyamine component amount is about 1 to about 10 parts by weight with respect to 100 parts by weight of the liquid crystal, the low molecular weight polyamine component amount is about 0.1 to about 1 parts by weight with respect to 100 parts by weight of the liquid crystal.

* * * * *